United States Patent
Park et al.

(10) Patent No.: US 10,289,134 B2
(45) Date of Patent: May 14, 2019

(54) CABLE COMPENSATION CIRCUIT

(71) Applicant: FAIRCHILD KOREA SEMICONDUCTOR LTD., Bucheon (KR)

(72) Inventors: Youngbae Park, Bucheon-si (KR); Eunsung Jang, Bucheon-si (KR); Jaehan Yoon, Bucheon-si (KR); Byunghak Ahn, Seoul (KR); Jin-Tae Kim, Seoul (KR); Taesung Kim, Suwon-si (KR); Gwanbon Koo, Bucheon-si (KR); Keun-Eui Hong, Cupertino, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 419 days.

(21) Appl. No.: 13/957,660

(22) Filed: Aug. 2, 2013

(65) Prior Publication Data

US 2014/0159678 A1 Jun. 12, 2014

Related U.S. Application Data

(60) Provisional application No. 61/679,173, filed on Aug. 3, 2012, provisional application No. 61/696,367, filed on Sep. 4, 2012.

(30) Foreign Application Priority Data

Jul. 8, 2013 (KR) ........................ 10-2013-0079957

(51) Int. Cl.
G05F 1/00 (2006.01)
G05F 1/10 (2006.01)
H02M 3/335 (2006.01)
H02M 1/00 (2006.01)

(52) U.S. Cl.
CPC .......... *G05F 1/10* (2013.01); *H02M 3/33523* (2013.01); *H02M 2001/0025* (2013.01)

(58) Field of Classification Search
CPC ......... H02M 3/33507; H02M 3/33523; H02M 2001/0025; H02M 2001/0009; H02M 3/156; H02M 2001/0003; Y10T 307/406; H02J 7/08
USPC ........... 363/21.12–21.15; 323/220, 223, 229, 323/233, 265
See application file for complete search history.

(56) References Cited

U.S. PATENT DOCUMENTS

| | | | |
|---|---|---|---|
| 4,862,339 A * | 8/1989 | Inou | H02M 1/08 363/21.07 |
| 7,321,499 B2 | 1/2008 | Halamik et al. | |
| 7,952,895 B2 * | 5/2011 | Matthews | 363/21.15 |

(Continued)

FOREIGN PATENT DOCUMENTS

| | | |
|---|---|---|
| CN | 101841248 | 9/2010 |
| TW | I320990 | 2/2010 |

*Primary Examiner* — Henry E Lee, III
(74) *Attorney, Agent, or Firm* — AMPACC Law Group, PLLC

(57) ABSTRACT

One cable compensation circuit is connected to a shunt regulator to generate a feedback voltage corresponding to an output voltage of a power supply device. The cable compensation circuit controls cathode impedance of the shunt regulator according to the output current of the power supply device to compensate a voltage drop generated in a cable.

22 Claims, 10 Drawing Sheets

(56) References Cited

U.S. PATENT DOCUMENTS

| | | | |
|---|---|---|---|
| 7,995,359 B2* | 8/2011 | Djenguerian et al. | 363/21.12 |
| 8,143,845 B2 | 3/2012 | Choi | |
| 8,385,088 B2* | 2/2013 | Bailey et al. | 363/21.15 |
| 2010/0238688 A1* | 9/2010 | Samejima | H02M 3/33507 363/21.01 |
| 2011/0018609 A1 | 1/2011 | Chou et al. | |
| 2012/0300516 A1* | 11/2012 | Chen | H02M 3/28 363/78 |
| 2013/0155724 A1* | 6/2013 | Baurle | 363/15 |

* cited by examiner

CABLE COMPENSATION CIRCUIT

CROSS-REFERENCE TO RELATED APPLICATION

This application claims priorities to and the benefits of U.S. Patent Application No. 61/679,173 filed in the USPTO on Aug. 3, 2012, and U.S. Patent Application No. 61/696,367 filed in the USPTO on Sep. 4, 2012, and the priority and benefit of Korean Patent Application No. 10-2013-0079957 filed in the Korean Intellectual Property Office on Jul. 8, 2013, the entire contents of which are incorporated herein by reference.

BACKGROUND (a) Field

Embodiments relates to a cable compensation circuit for compensating a voltage drop of a cable. For example, the cable compensation circuit to compensate the voltage drop generated in the cable is connected between a power supply device and a battery.

(b) Description of the Related Art

A cable is connected between an output capacitor of a charger and a battery. When the output current of the charger is small, the voltage drop generated in the cable is not a problem. However, when the output current is high (when a load is large), the voltage drop generated in the cable is increased such that the voltage supplied to the battery is decreased.

The output voltage of the charger is controlled as a rated voltage to be suitable for battery charging, however the voltage supplied to the battery is smaller than the rated voltage because of the voltage drop of the cable.

The above information disclosed in this Background section is only for enhancement of understanding of the background of the invention and therefore it may contain information that does not form the prior art that is already known in this country to a person of ordinary skill in the art.

SUMMARY

A means compensating a voltage drop by a cable is provided.

A cable compensation circuit according to an exemplary embodiment compensates a voltage drop of a cable connected between a power supply device and a load.

The cable compensation circuit includes a diode in which an anode voltage is increased according to an increase of an output current of the power supply device and at least two resistors dividing the anode voltage.

Also, the cable compensation circuit includes a node in which a voltage that is decreased according to an increase of the output current of the power supply device is generated and a diode connected to the node and a secondary side of the power supply device, and the reference terminal of the shunt regulator of the power supply device is connected to the node.

The cable compensation circuit increases the cathode impedance of the shunt regulator of the power supply device as the output current is increased. Energy transmitted to the secondary side of the power supply device is increased according to the increase of the cathode impedance of the shunt regulator.

The cable compensation circuit according to the present invention is connected to the shunt regulator to generate the feedback voltage corresponding to the output voltage of the power supply device. The cable compensation circuit includes a first node in which a voltage that is changed according to an output current of the power supply device is generated and a diode connected between the first node and a second node coupled to a reference terminal of the shunt regulator, wherein a cathode impedance of the shunt regulator is controlled according to a voltage of the second node and a feedback voltage is changed according to the cathode impedance of the shunt regulator.

The first node is connected to an anode of the rectifying diode to which the output current flows.

The cable compensation circuit further includes a first resistor connected between a cathode of the diode and the second node, a second resistor including one terminal connected to the second node and the other terminal coupled to a ground, and a transistor including a control terminal coupled to the second node and a first terminal coupled to the reference terminal of the shunt regulator.

The cable compensation circuit may further include a first capacitor connected between the second node and the ground.

The cable compensation circuit may further include a second capacitor connected between the cathode of the diode and the ground. The cable compensation circuit may further include a third resistor connected between the first terminal of the transistor and the reference terminal of the shunt regulator.

The cable compensation circuit may further include a fourth resistor connected between the second node and the control terminal of the transistor, and a fifth resistor connected between the first terminal of the transistor and the reference terminal of the shunt regulator.

The cable compensation circuit may further include a sixth resistor connected between the second node and the control terminal of the transistor, a seventh resistor connected between the second node and the ground, and an eighth resistor connected between the first terminal of the transistor and the reference terminal of the shunt regulator. A temperature change characteristic of the seventh resistor may be opposite to a temperature change characteristic of the transistor.

The cable compensation circuit may further include an eighth resistor connected between the second node and the control terminal of the transistor, a first transistor connected between the other terminal of the third resistor and the ground and diode-connected, and a ninth resistor connected between the first terminal of the transistor and the reference terminal of the shunt regulator. A forward voltage of the first transistor is decreased according to the temperature change to compensate the current increase of the transistor according to the temperature change, or the forward voltage of the first transistor is increased according to the temperature change to compensate the current decrease of the transistor according to the temperature change.

The cable compensation circuit may further include a tenth resistor connected between the cathode of the diode and the second node, an eleventh resistor including one terminal connected to the second node and the other terminal coupled to the ground, and a first shunt regulator coupled to the reference terminal of the shunt regulator, and the current flowing to the first shunt regulator is varied according to the voltage of the second node such that the reference terminal voltage of the shunt regulator is changed.

The reference terminal of the first shunt regulator is connected to the second node, and the cable compensation circuit further includes a twelfth resistor connected between the reference terminal of the first shunt regulator and the cathode, and a thirteenth resistor connected between the cathode of the first shunt regulator and the reference terminal of the shunt regulator.

The cable compensation circuit may further include a first capacitor connected between the second node and the ground.

A cable compensation circuit according to the present invention is connected to a shunt regulator to generate a feedback voltage corresponding to an output voltage of a power supply device, and includes: a third node in which a voltage that is changed according to an output current of the power supply device is generated; and a diode connected between the third node and an anode of the shunt regulator, wherein a cathode impedance of the shunt regulator is controlled according to a voltage of the third node and a feedback voltage is changed according to the cathode impedance of the shunt regulator.

The third node is connected to an anode of a rectifying diode to which the output current flows.

The cable compensation circuit includes a fourteenth resistor connected between the third node and the ground, and a capacitor connected to the fourteenth resistor in parallel, wherein the capacitor filters a noise of the voltage of the fourth node.

A cable compensation circuit according to the present invention is connected to a shunt regulator to generate a feedback voltage corresponding to an output voltage of a power supply device, and includes a third node in which a voltage that is changed according to an on period of the power switch of the power supply device is generated, and a diode coupled between a rectifying diode to which an output current of the power supply device flows and the fourth node, wherein a cathode impedance of the shunt regulator is controlled according to a voltage of the fourth node and a feedback voltage is changed according to the cathode impedance of the shunt regulator.

The cathode of the diode is connected to the anode of the rectifying diode, and the cable compensation circuit further includes a fifteenth resistor connected between the anode of the diode and the fourth node, and a capacitor connected between the fourth node and the ground.

The anode of the rectifying diode is connected to the secondary coil of the power supply device, and when the power switch of the power supply device is turned on, the diode is turned on by the voltage of the secondary coil.

The cable compensation circuit further includes a diode connected between the cathode of the rectifying diode and the fourth node, and a capacitor storing a difference between a forward voltage of the rectifying diode generated by the output current and a forward voltage of the diode.

The capacitor is connected between the fourth node and the ground, and a forward voltage of the rectifying diode is increased by the increase of the output current such that a negative voltage charged to the capacitor is decreased.

The capacitor is connected between the output voltage and the fourth node, and the forward voltage of the rectifying diode is increased by the increase of the output current such that the voltage of the fourth node is decreased according to the increase of the voltage charged to the capacitor.

The cable compensation circuit may further include a sixteenth resistor connected between the anode of the diode and the fourth node, and a seventeenth resistor connected between the output voltage and the fourth node.

The cable compensation circuit may further include an eighteenth resistor connected between the fourth node and the reference terminal of the shunt regulator.

The voltage drop of the cables is compensated by one among the exemplary embodiments.

DETAILED DESCRIPTION OF THE EMBODIMENTS

Figure 1:
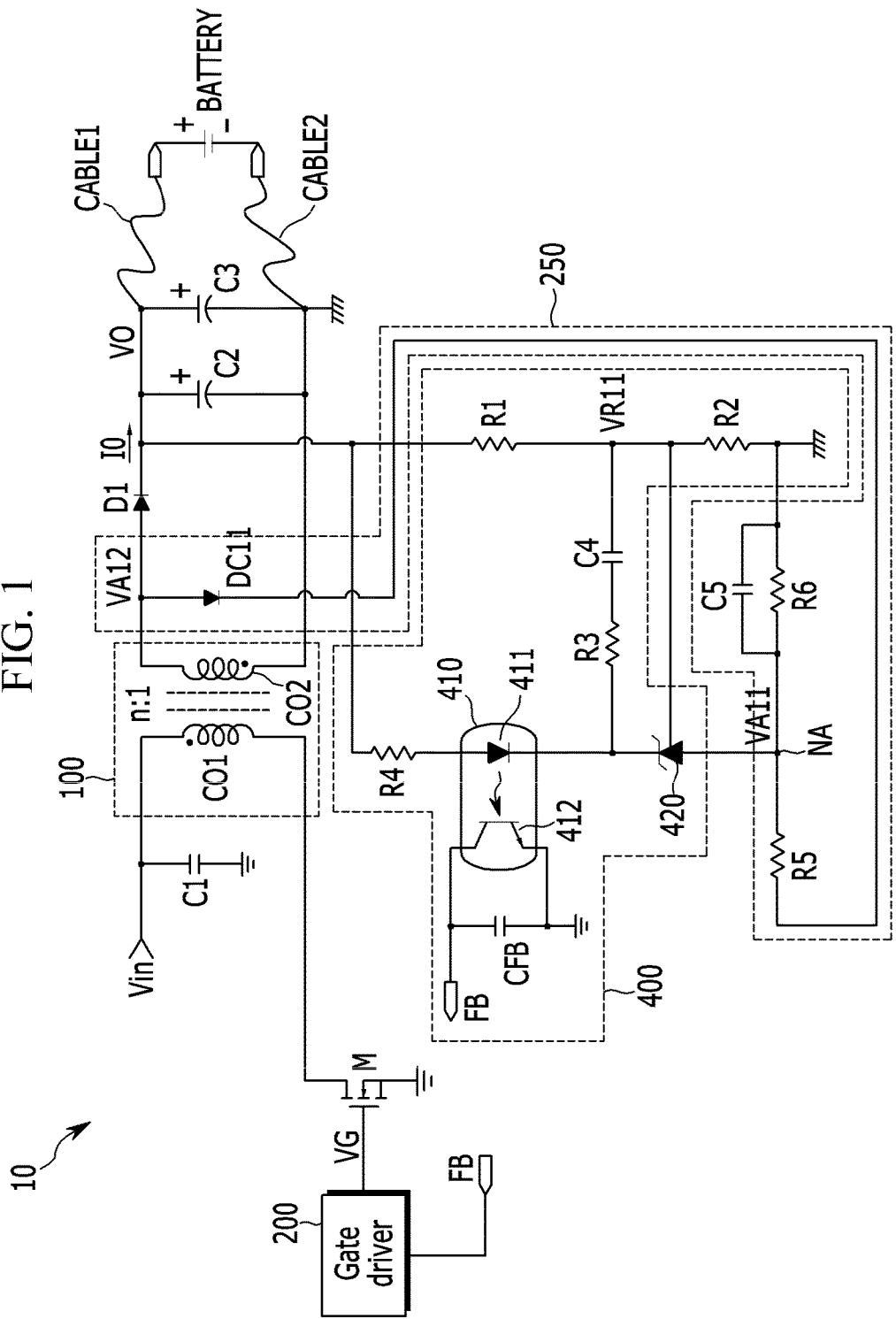
FIG. 1 is a view of a cable compensation circuit according to a first exemplary embodiment.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Now, a cable compensation circuit according to exemplary embodiments will be described with reference to FIG. 1 to FIG. 10.

FIG. 1 is a view of a cable compensation circuit according to the first exemplary embodiment. A cable compensation circuit 250 according to an exemplary embodiment is connected to a secondary side of a power supply device 10 and controls an operation of a feedback circuit according to a load.

The power supply device 10 includes a capacitor C1, a transformer 100, a rectifying diode D1, output capacitors C2 and C3, a power switch M, a gate driver 200, and a feedback circuit 400.

An input voltage Vin is smoothed by the capacitor C1 and is transmitted to a primary side of the transformer 100.

The transformer 100 includes a primary coil CO1 and a secondary coil CO2, and a coil ratio of the transformer is n:1 (a winding number of CO1 to a winding of CO2).

One terminal of the primary coil CO1 is supplied with the input voltage Vin and the other terminal of the primary coil CO1 is connected to the power switch M. Energy stored to the primary coil CO1 during an on period of the power switch M is transmitted to the secondary coil CO2 in an off period of the power switch M.

A gate electrode of the power switch M is connected to an output of the gate driver 200 and switching is performed according to a gate voltage VG output from the gate driver 200. The power switch M is an n channel type of transistor such that it is turned on by a gate voltage VG of a high level and is turned off according to a gate voltage VG of a low level.

The gate driver 200 generates the gate voltage VG according to a feedback signal FB. For example, the gate driver 200 generates the gate voltage VG for the energy transmitted to the secondary side to be decreased as the voltage of the feedback signal FB is decreased, and for the energy transmitted to the secondary side to be increased as the voltage of the feedback signal FB is increased.

The rectifying diode D1 is connected between one terminal of the secondary coil CO2 and the output terminal, and is turned on during the off period of the power switch M. The current transmitted to the secondary side is transmitted to a load through the rectifying diode D1.

In the first exemplary embodiment, a battery could be a load as an example. The output terminal of the power supply device 10 is connected to the battery through the cables CABLE1 and CABLE2. The power supply device 10 may perform a charger function of supplying a charging current to the battery. The output capacitors C2 and C3 are coupled in parallel to the output terminal of the power supply device 10, the CABLE1 is connected to one terminal of the output capacitors C2 and C3 and the (+) terminal of the battery, and the CABLE2 is connected to the other terminal (a secondary side ground) of the output capacitors C2 and C3 and the (−) terminal of the battery.

The output capacitors C2 and C3 reduce a ripple of the output voltage VO to smooth the output voltage VO.

The feedback circuit 400 generates a feedback signal corresponding to the output voltage VO. The feedback circuit 400 includes an opto-coupler 410, a shunt regulator 420, four resistors R1-R4, and two capacitors C4 and CFB. The opto-coupler 410 includes an opto-diode 411 and an opto-transistor 412.

The output voltage VO is divided by the resistor R1 and the resistor R2 and a reference voltage VR11 is generated. The shunt regulator 420 includes a reference terminal input with the reference voltage VR11, a cathode connected to the cathode of the opto-diode 411, and an anode connected to a node NA.

The shunt regulator 420 generates a sink current according to a difference between the reference voltage VR11 as the voltage of a reference terminal and the voltage VA11 of the anode (hereinafter, referring to a reference of the shunt regulator 420). Accordingly, if the output voltage VO is increased, the current sinking through the opto-diode 411 is increased by the shunt regulator 420, and if the output voltage VO is decreased, the current sinking through the opto-diode 411 is decreased by the shunt regulator 420.

A gain of the shunt regulator 420 is determined by the capacitor C4 and the resistor R3 that are connected in series between the reference terminal of the shunt regulator 420 and the cathode. The gain of the shunt regulator 420 is a ratio between the reference terminal voltage change and the cathode voltage change.

The resistor R4 is connected between the output voltage VO and the anode of the opto-diode 411. The resistor R4 supplies a bias current of the shunt regulator 420.

The current flowing to the opto-transistor 412 is proportional to the current flowing to the opto-diode 411. The capacitor CFB is connected in parallel to the opto-transistor 412. As the current flowing to the opto-diode 411 is increased, the current flowing to the opto-transistor 412 is increased and the capacitor CFB is discharged according to the current increase of the opto-transistor 412, and the voltage of the feedback signal FB is decreased.

As the current flowing to the opto-diode 411 is decreased, the current flowing to the opto-transistor 412 is decreased and the capacitor CFB is charged according to the current decrease of the opto-transistor 412, and the voltage of the feedback signal FB is increased.

As the load is increased, the output voltage VO is decreased such that the voltage of the feedback signal FB is increased. Thus, the gate driver 200 controls the switching operation in the direction that the energy transmitted to the secondary side is increased. For example, the gate driver 200 may increase an on-duty of the gate voltage VG.

As the load is decreased, the output voltage VO is increased such that the voltage of the feedback signal FB is decreased. Thus, the gate driver 200 controls the switching operation in the direction that the energy transmitted to the secondary side is decreased. For example, the gate driver 200 may decrease an on-duty of the gate voltage VG.

The cable compensation circuit 250 decreases the reference of the shunt regulator 420 as the output current IO is increased such that the cathode impedance of the shunt regulator 420 is increased. Thus, the current flowing to the opto-diode 411 is decreased such that the energy transmitted to the secondary side is increased.

That is, the cable compensation circuit 250 controls the voltage between the reference terminal of the shunt regulator 420 and the anode to control the voltage of the feedback signal FB. The cable compensation circuit 250 includes a diode DC11, a resistor R5, a resistor R6, and a capacitor C5.

The diode DC11 is connected to the output terminal of the power supply device 10. In detail, the diode DC11 includes an anode connected to the anode of the rectifying diode D1 and one terminal of the secondary coil CO2, and a cathode connected to one terminal of the resistor R5. The anode voltage of the diode DC11 is changed according to the output current IO supplied to the load. For example, as the output current IO is increased, the anode voltage VA12 of the diode DC11 is also increased, and as the output current IO is decreased, the anode voltage VA12 of the diode DC11 is also decreased.

The resistor R5 is connected between the cathode of the diode DC11 and the node NA, the resistor R6 is connected between the node NA and the secondary side ground, and the capacitor C5 is connected to the resistor R6 in parallel. The capacitor C5 filters a noise of the anode voltage VA11.

The anode voltage VA12 is divided by the resistor R5 and the resistor R6 such that the voltage of the node NA, that is, the anode voltage VA11, is determined. The current flowing to the shunt regulator 420 is determined according to the difference between the reference voltage VR11 and the anode voltage VA11 of the shunt regulator 420.

Accordingly, if the anode voltage VA12 is increased by the increase of the output current IO, the anode voltage VA11 is also increased, and the difference between the reference voltage VR11 of the reference terminal of the shunt regulator 420 and the anode voltage VA11, that is, the reference of the shunt regulator 420, is decreased. Thus, the voltage of the feedback signal FB is increased compared with a conventional art not having the cable compensation circuit 250.

As the voltage of the feedback signal FB becomes higher, the energy transmitting to the secondary side is increased such that the energy transmitted to the secondary side is further increased compared with the conventional art. Accordingly, the voltage drop generated in the cables CABLE1 and CABLE2 are compensated according to the increase of the output current IO. That is, to maintain the voltage supplied to the battery as the rated voltage, the output voltage VO is increased to a level at which the voltage drop is compensated.

According to the first exemplary embodiment, the anode voltage VA11 is increased according to the increase of the output current IO such that the voltage of the feedback signal FB is increased, and thereby the energy transmitted to the secondary side is also increased. Accordingly, the increase of the voltage drop generated in the cables CABLE1 and CABLE2 according to the increase of the output current IO is compensated by an exemplary embodiment.

The cable compensation circuit may have numerous variations, and the present invention is not limited to the exemplary embodiment shown in FIG. 1. That is, the cable compensation circuit increases the cathode impedance of the shunt regulator 420 according to the increase of the output current IO such that the current flowing to the opto-diode is decreased, thereby realizing the circuit increasing the energy transmitted to the secondary side.

For example, in the exemplary embodiment of FIG. 1, the cable compensation circuit increases the anode voltage VA11 of the shunt regulator 420 according to the increase of the output current IO. Alternately, the reference voltage of the reference terminal of the shunt regulator 420 may be decreased according to the increase of the output current IO, thereby decreasing the reference of the shunt regulator 420.

Figure 2:
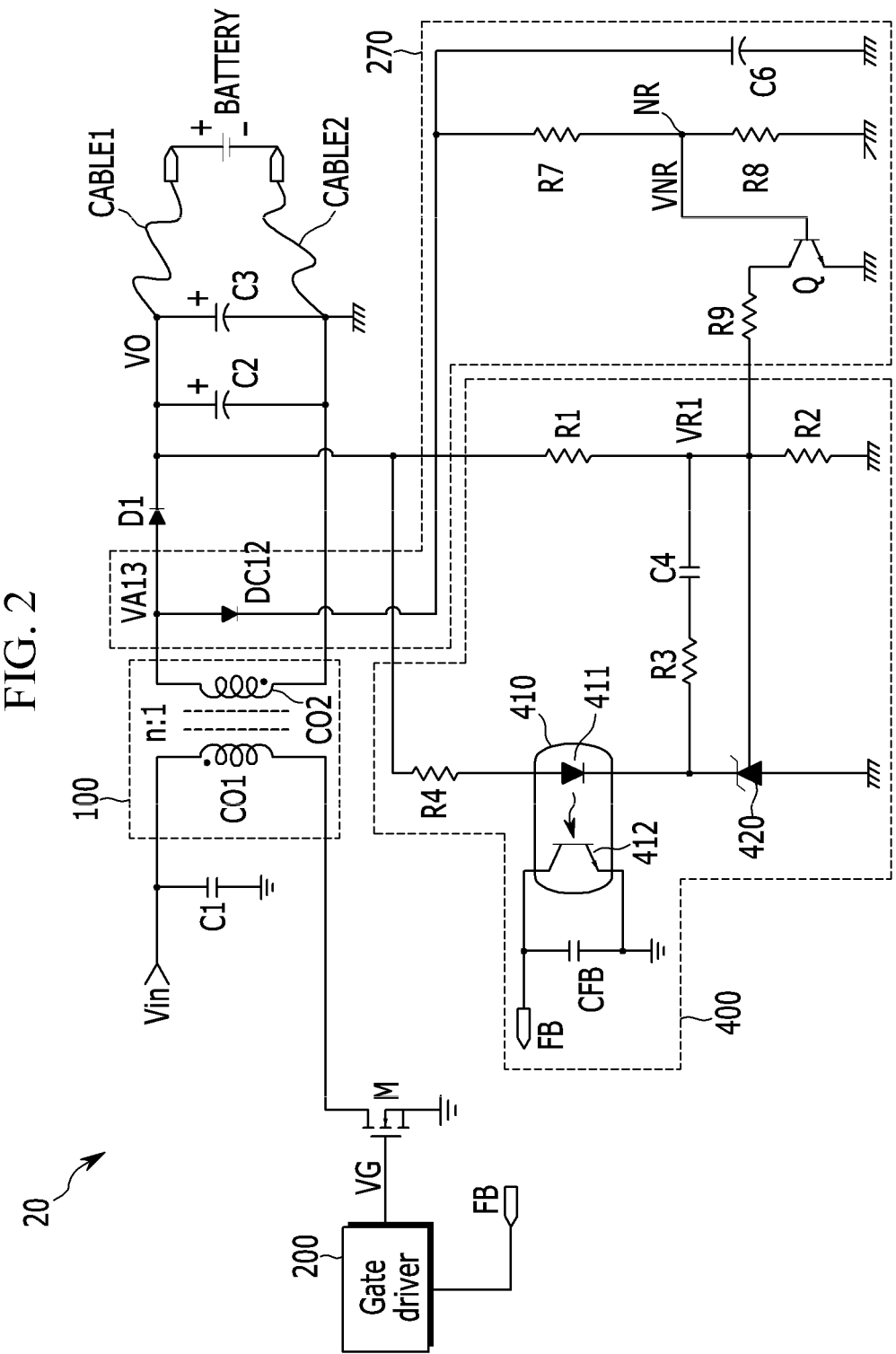
FIG. 2 is a view of a cable compensation circuit according to a second exemplary embodiment.

FIG. 2 is a view of a cable compensation circuit according to the second exemplary embodiment.

Compared with the above exemplary embodiment, the overlapping components are indicated by the same reference numerals and the overlapping description is omitted. As shown in FIG. 2, a cable compensation circuit 270 according to the second exemplary embodiment is connected to the secondary side of a power supply device 20 to control the operation of the feedback circuit according to the load.

Compared with FIG. 1, the anode of the shunt regulator 420 is not connected to the cable compensation circuit but is directly connected to the secondary side ground, and the reference terminal of the shunt regulator 420 is connected to the cable compensation circuit 270.

The cable compensation circuit 270 also decreases the reference of the shunt regulator 420 as the output current IO is increased such that the cathode impedance of the shunt regulator 420 is increased. Thus, the current flowing through the opto-diode 411 is decreased such that the energy transmitted to the secondary side is increased.

As shown in FIG. 2, the cable compensation circuit 270 controls the base voltage of a BJT Q according to the anode voltage VA13 thereby controlling the reference terminal voltage VR1 of the shunt regulator 420.

The cable compensation circuit 270 includes a diode DC12, a resistor R7, a resistor R8, a resistor R9, the BJT Q, and a capacitor C6.

The diode DC12 is connected to the output terminal of the power supply device 20. In detail, the anode of the diode DC12 is connected to the anode of the rectifying diode D1 of the secondary side and one terminal of the secondary coil CO2, and the cathode of the diode DC12 is connected to one terminal of the resistor R7 and one terminal of the capacitor C6.

An anode voltage VA13 of the diode DC12 is changed according to the output current IO supplied to the load. For example, as the output current IO is increased, the anode voltage VA13 is also increased, and as the output current IO is decreased, the anode voltage VA13 is also decreased.

The resistor R8 is connected between the other terminal of the resistor R7 and the secondary side ground. The voltage VNR of the node NR of the resistors R7 and R8 is applied to the base of the BJT Q.

The capacitor C6 is connected between the cathode of the diode DC12 and the secondary side ground to filter the noise of the voltage VNR.

The emitter of the BJT Q is connected to the secondary side ground, and the collector thereof is connected to one terminal of the resistor R9. The other terminal of the resistor R9 is connected to the reference terminal of the shunt regulator 420.

The anode voltage VA13 is divided by the resistor R7 and the resistor R8 thereby determining the voltage of the node NR, that is, the voltage VNR. The current flowing to the BJT Q is determined according to the voltage VNR, and as the current flowing to the BJT Q is increased, the reference terminal voltage of the shunt regulator 420, that is, the reference voltage VR1 is decreased.

The current flowing to the shunt regulator 420 is determined according to the reference of the shunt regulator 420, that is, the difference between the reference voltage VR1 and the anode voltage of the shunt regulator 420. In another exemplary embodiment, the anode voltage of the shunt regulator 420 is the ground level. Accordingly, the current flowing to the shunt regulator 420 is determined according to the reference voltage VR1.

If the anode voltage VA13 is increased by the increase of the output current IO, the voltage VNR is increased and the reference voltage VR1 is decreased. Thus, the voltage of the feedback signal FB is increased compared with the conventional art not having the cable compensation circuit 270.

As the voltage of the feedback signal FB is increased, the energy transmitted to the secondary side is increased such that the energy transmitted to the secondary side is further increased compared with the conventional art. Accordingly, the voltage drop generated in the cables CABLE1 and CABLE2 is compensated according to the increase of the output current IO. That is, to maintain the voltage supplied to the battery as the rated voltage, the output voltage VO is increased to the level at which the voltage drop is compensated.

Like the previous exemplary embodiment, in the second exemplary embodiment, the anode voltage VA13 is increased according to the increase of the output current IO such that the voltage of the feedback signal FB is increased, thereby also increasing the energy transmitted to the secondary side. Accordingly, the increase of the voltage drop generated in the cables CABLE1 and CABLE2 according to the increase of the output current IO is compensated by another exemplary embodiment.

Figure 3:
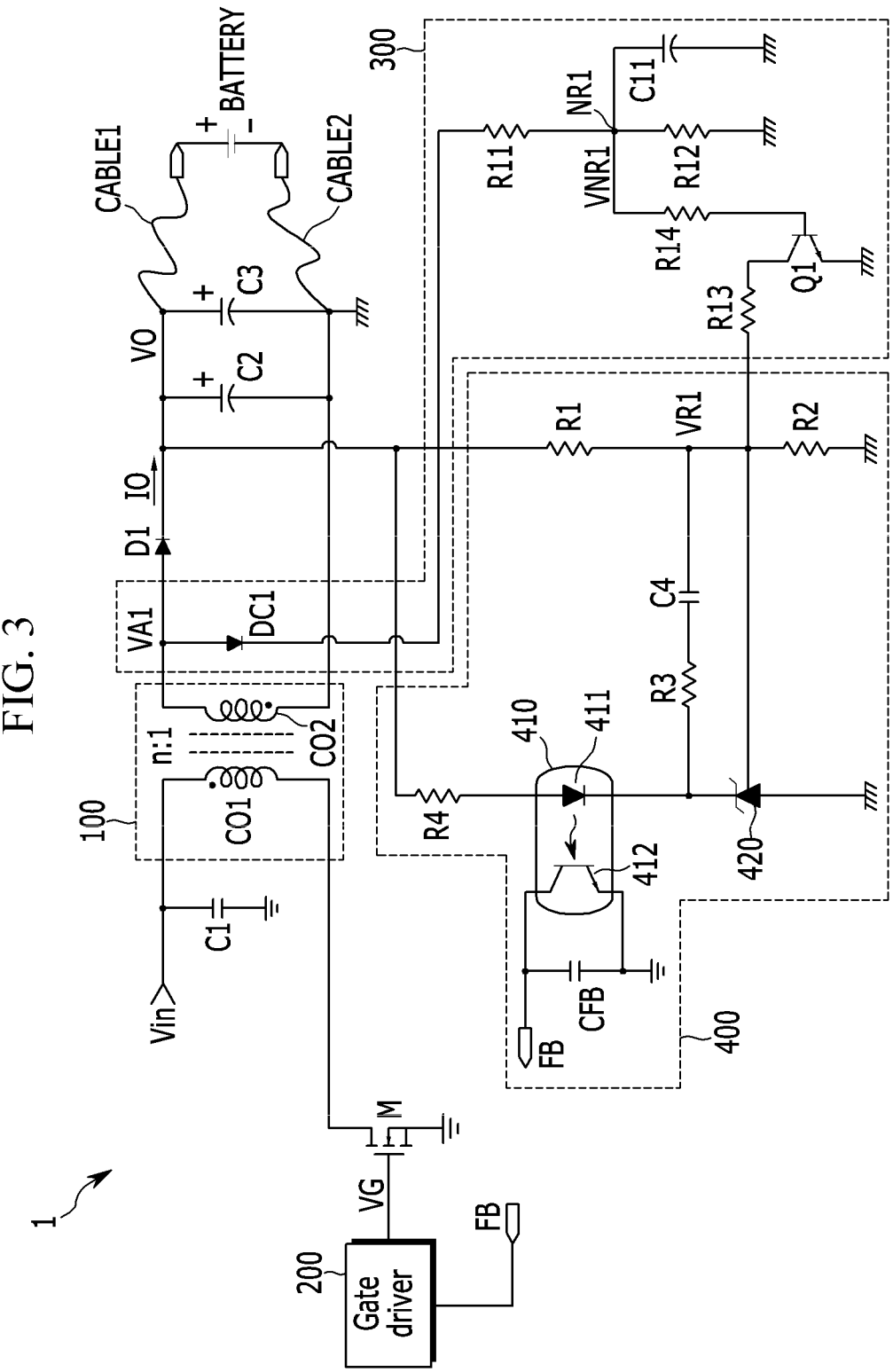
FIG. 3 is a view of a cable compensation circuit according to a third exemplary embodiment.

FIG. 3 is a view of a cable compensation circuit according to the third exemplary embodiment. The cable compensation circuit 300 according to the third exemplary embodiment is connected to the secondary side of the power supply device 1 thereby controlling the operation of the feedback circuit according to the load.

The same components as in the previous exemplary embodiment are indicated by the same reference numerals and the overlapping description is omitted.

The power supply device 1 includes the capacitor C1, the transformer 100, the rectifying diode D1, the output capacitors C2 and C3, the power switch M, the gate driver 200, and the feedback circuit 400, and is connected to the cable compensation circuit 300.

The output voltage VO is divided by the resistors R1 and R2 to generate the reference voltage VR1. The voltage of the reference terminal of the shunt regulator 420 is referred to as the reference voltage VR1, like in the second exemplary embodiment.

The cable compensation circuit 300 controls the cathode impedance of the shunt regulator 420 according to the output current IO. For example, the cable compensation circuit 300 decreases the reference of the shunt regulator 420 as the output current IO is increased such that the cathode impedance of the shunt regulator 420 is increased. Thus, the current flowing to the opto-diode 411 is decreased such that the energy transmitted to the secondary side is increased.

The output current IO means the load current supplied to the load (the battery in an exemplary embodiment).

That is, the cable compensation circuit 300 controls the reference terminal voltage of the shunt regulator 420 thereby controlling the voltage of the feedback signal FB. The cable compensation circuit 300 controls the base voltage of the BJT Q1 according to the anode voltage VA1 to control the reference terminal voltage VR1 of the shunt regulator 420.

The cable compensation circuit 300 includes the diode DC1, four resistors R11, R12, R13, and R14, the BJT Q1, and the capacitor C11.

The diode DC1 is connected to the output terminal of the power supply device 1. In detail, the anode of the diode DC1 is connected to the anode of the rectifying diode D1 of the secondary side and one terminal of the secondary coil CO2, and the cathode of the diode DC1 is connected to one terminal of the resistor R11.

The anode voltage VA1 of the diode DC1 is changed according to the output current IO supplied to the load. For example, as the output current IO is increased, the anode voltage VA1 is also increased, and as the output current IO is decreased, the anode voltage VA1 is also decreased.

One terminal of the resistor R12 is connected to the other terminal of the resistor R11, and the other terminal of the resistor R12 is connected to the secondary side ground. The voltage VNR1 of the node NR1 connected to the resistors R11 and R12 is applied to the base of the BJT Q1 through the resistor R14.

The capacitor C11 is connected between the node NR1 and the secondary side ground thereby smoothing the voltage VNR1.

The emitter of the BJT Q1 is connected to the secondary side ground, and the collector thereof is connected to one terminal of the resistor R13. The other terminal of the resistor R13 is connected to the reference terminal of the shunt regulator 420.

After the anode voltage VA1 is rectified by the diode DC1, it is divided by the resistor R11 and the resistor R12, thereby determining the voltage of the node NR1, that is, the voltage VNR1. The current flowing to the BJT Q1 is determined according to the voltage VNR1, and as the current flowing to the BJT Q1 is increased, the reference terminal voltage of the shunt regulator 420, that is, the reference voltage VR1, is decreased.

The current flowing to the shunt regulator 420 is determined by the reference of the shunt regulator 420, that is, the difference between the reference voltage VR1 and the anode voltage of the shunt regulator 420. In the third exemplary embodiment, the anode voltage of the shunt regulator 420 is the ground level. Accordingly, the current flowing to the shunt regulator 420 is determined according to the reference voltage VR1.

If the anode voltage VA1 is increased by the increase of the output current IO, the voltage VNR1 is increased and the reference voltage VR1 is decreased. Thus, the voltage of the feedback signal FB is increased compared with the conventional art not having the cable compensation circuit 300.

As the voltage of the feedback signal FB is increased, the energy transmitted to the secondary side is increased such that the energy transmitted to the secondary side is further increased compared with the conventional art. Accordingly, the voltage drop generated in the cables CABLE1 and CABLE2 is compensated according to the increase of the output current IO. That is, the output voltage VO is increased such that the voltage drop generated in the cables is compensated, and the voltage supplied to the battery is maintained as the rated voltage.

The cable compensation circuit according to the fourth exemplary embodiment further includes a resistor compensating a variation according to a temperature change of the BJT.

Figure 4:
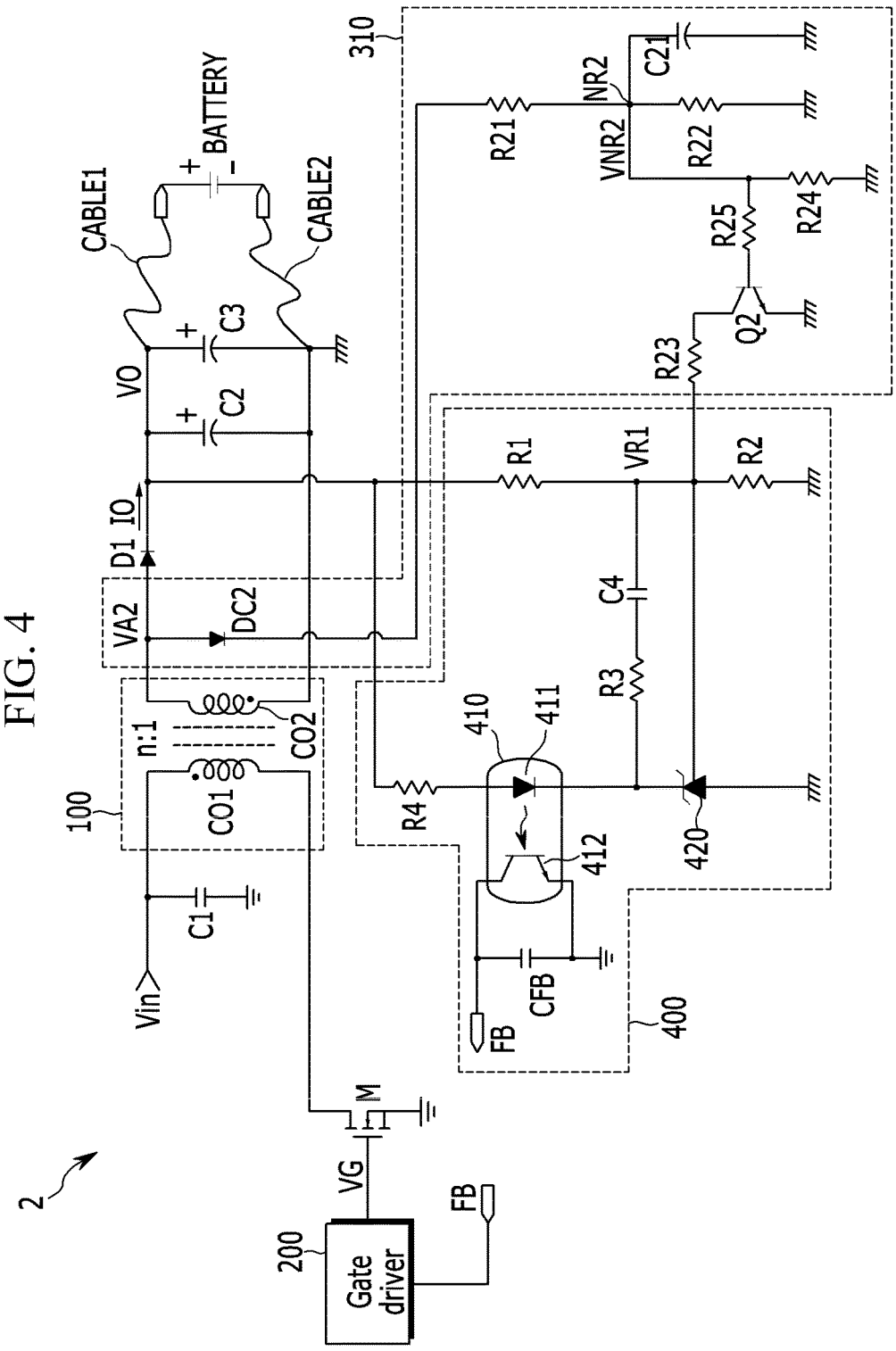
FIG. 4 is a view of a cable compensation circuit according to a fourth exemplary embodiment.

FIG. 4 is a view of a cable compensation circuit according to the fourth exemplary embodiment.

As shown in FIG. 4, a cable compensation circuit 310 according to the fourth exemplary embodiment is connected to the secondary side of a power supply device 2 to control the operation of the feedback circuit according to the load.

The cable compensation circuit 310 further includes the diode DC2, five resistors R21-R25, and the capacitor C21. Compared with the cable compensation circuit shown in FIG. 3, the resistor R24 connected between the base of the BJT Q2 and the ground is further included.

The cable compensation circuit 310 further includes the resistor R24 to compensate the temperature deviation of the BJT Q2. When the current flowing to the BJT Q2 is changed according to the temperature change, the resistor to compensate the change is connected to the base of the BJT Q2. The resistance of the resistor R24 is changed according to the temperature.

The anode voltage VA2 of the diode DC2 is increased as the output current IO is increased, and as the output current IO is decreased, it is decreased. The resistor R21 is connected between the cathode of the diode DC2 and the node NR2. The resistor R22, the resistor R24, and the capacitor C21 are connected between the node NR2 and the ground. The resistor R25 is connected between the node NR2 and the base of the BJT Q2.

The current applied to the base of the BJT Q2 is changed according to the voltage VNR2 of the node NR2. The capacitor C21 smoothes the voltage VNR2.

The emitter of the BJT Q2 is connected to the secondary side ground, and the collector thereof is connected to one terminal of the resistor R23. The other terminal of the resistor R23 is connected to the reference terminal of the shunt regulator 420.

The anode voltage VA2 is rectified by the diode DC2 and is divided by the resistors R21 and R22 such that the voltage VNR2 is determined. The current flowing to the BJT Q2 is determined according to the voltage VNR2, and as the current flowing to the BJT Q2 is increased, the reference terminal voltage of the shunt regulator 420, that is, the reference voltage VR1, is decreased.

To prevent the current flowing to the BJT Q2 from being changed according to the temperature change, the resistor R24 has a temperature change characteristic that is opposite to the temperature change characteristic of the BJT Q2.

For example, when the current flowing to the BJT Q2 is increased according to the increase of the temperature, the resistor R24 is realized for the resistance thereof to be decreased according to the temperature increase. Thus, when the temperature is increased, the resistance of the resistor R24 is decreased such that the base voltage is decreased. Accordingly, the increase of the current flowing to the BJT Q2 may be prevented.

In contrast, when the current flowing to the BJT Q2 is decreased according to the temperature decrease, the resistor R24 may be realized for the resistance thereof to be increased according to the temperature decrease. Thus, when the temperature is decreased, the resistance of the resistor R24 is increased such that the base voltage is increased. Accordingly, the decrease of the current flowing to the BJT Q2 may be prevented.

The cable compensation circuit according to the fifth exemplary embodiment may compensate the deviation according to the temperature change of the BJT by using the BJT instead of the resistor 24 of the fourth exemplary embodiment.

Figure 5:
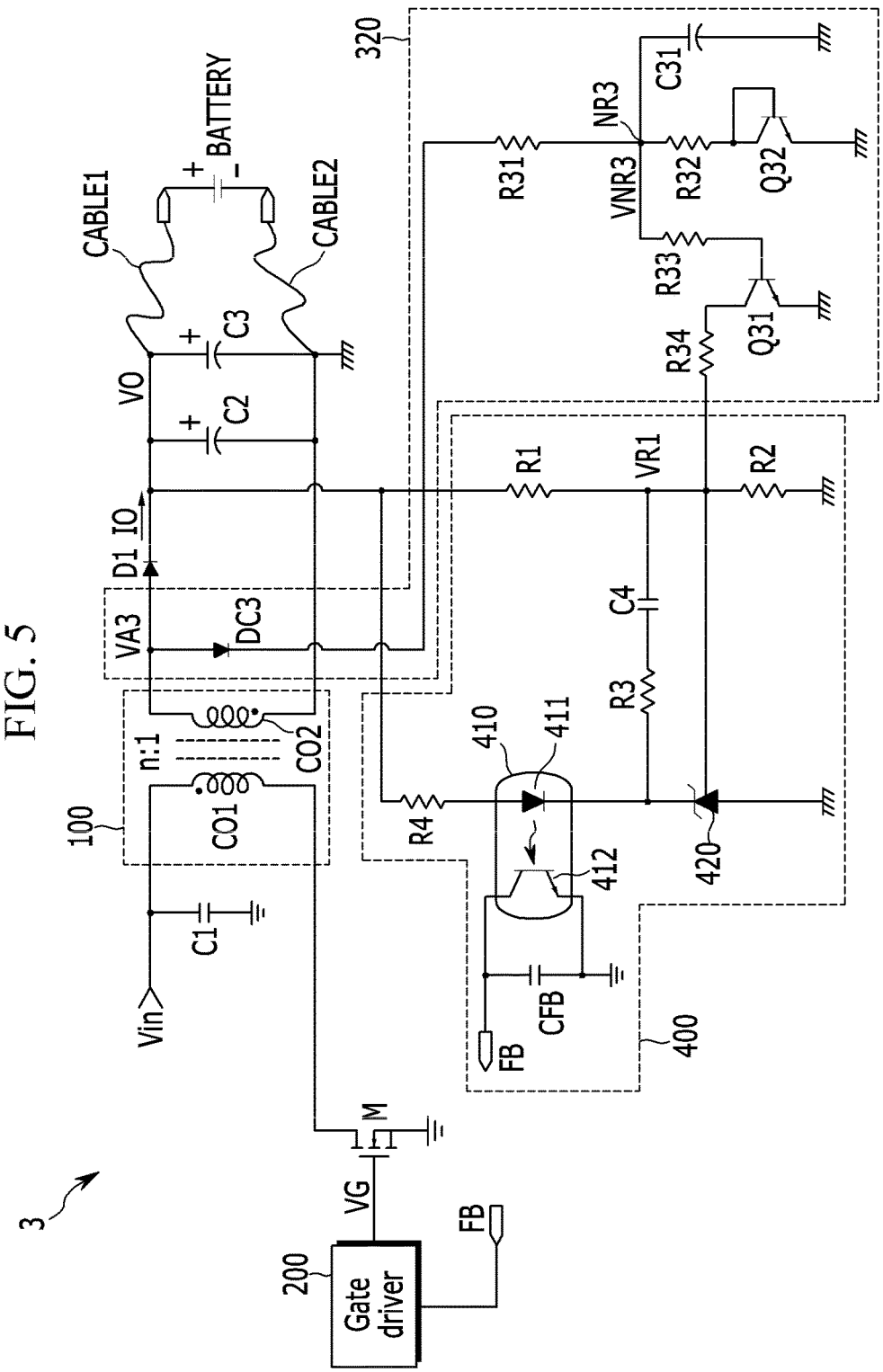
FIG. 5 is a view of a cable compensation circuit according to a fifth exemplary embodiment.

FIG. 5 is a view of a cable compensation circuit according to the fifth exemplary embodiment.

As shown in FIG. 5, a cable compensation circuit 320 according to the fifth exemplary embodiment is connected to the secondary side of a power supply device 3 to control the operation of the feedback circuit according to the load.

The cable compensation circuit 320 includes the diode DC3, four resistors R31-R34, the capacitor C31, the BJT Q31, and the BJT Q32. As shown in FIG. 5, the cable compensation circuit 320 further includes the BJT 32 of which the collector and the base are connected.

The deviation of the BJT 32 according to the temperature change is similar to the deviation of the BJT Q31. The base voltage of the BJT Q31 is controlled by the BJT Q32 such that the current flowing to the BJT Q31 according to the temperature change is not changed.

The anode of the diode DC3 is connected to the anode voltage VA3, and the cathode of the diode DC3 is connected to one terminal of the resistor R31. The other terminal of the resistor R31 is connected to the node NR3.

The capacitor C31 is connected between the node NR3 and the ground to smooth the voltage VNR3.

One terminal of the resistor R32 and one terminal of the resistor R33 are connected to the node NR3, and the collector of the BJT Q32 is connected to the other terminal of the resistor R32. The emitter of the BJT Q32 is connected to the secondary side ground.

The other terminal of the resistor R33 is connected to the base of the BJT Q31, and the collector of the BJT Q31 is connected to the reference terminal of the shunt regulator 420 through the resistor R34. The emitter of the BJT Q31 is connected to the secondary side ground.

The anode voltage VA3 is rectified by the diode DC3 and is divided by the resistors R31 and R32 and the on-resistance of the BJT Q32 such that the voltage VNR3 is determined. The voltage VNR3 is transmitted to the base of the BJT Q31 through the resistor R33.

The current flowing to the BJT Q31 is determined according to the voltage VNR3, and as the current flowing to the BJT Q31 is increased, the reference terminal voltage of the shunt regulator 420, that is, the reference voltage VR1, is decreased.

A forward voltage of the BJT Q32 used like a diode is changed according to the temperature change such that the voltage VNR3 is changed.

For example, if the forward voltage of the BJT Q32 is decreased according to the temperature increase, the equivalent resistance connected to the node NR3 is decreased such that the voltage VNR3 is decreased. That is, the base voltage of the BJT Q31 is decreased.

When the current flowing to the BJT Q31 is increased according to the temperature increase, the base voltage of the BJT Q31 is decreased such that the current increase of the BJT Q31 may be suppressed.

In contrast, if the on-resistance of the BJT Q32 is increased according to the temperature decrease, the equivalent resistance connected to the node NR3 is increased such that the voltage VNR3 is increased. That is, the base voltage of the BJT Q31 is increased.

When the current flowing to the BJT Q31 is decreased according to the temperature decrease, the base voltage of the BJT Q31 is increased such that the current decrease of the BJT Q31 may be suppressed.

Differently, the second to fifth exemplary embodiments may use the shunt regulator instead of the BJT.

The cable compensation circuit according to the sixth exemplary embodiment includes the shunt regulator instead of the BJT.

Figure 6:
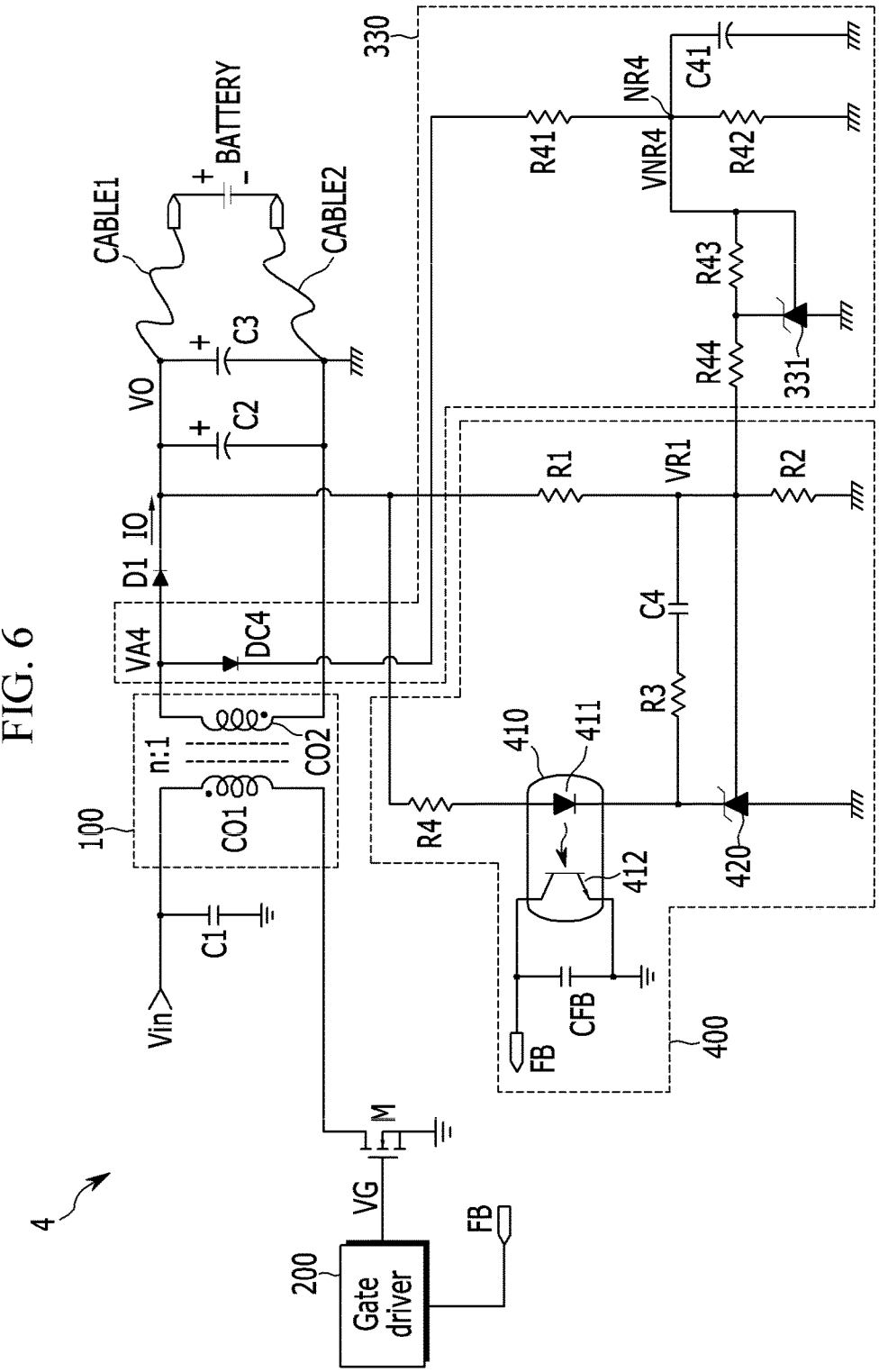
FIG. 6 is a view of a cable compensation circuit according to a sixth exemplary embodiment.

FIG. 6 is a view of a cable compensation circuit according to the sixth exemplary embodiment.

As shown in FIG. 6, a cable compensation circuit 330 according to the sixth exemplary embodiment is connected to the secondary side of a power supply device 4 such that the operation of the feedback circuit is controlled according to the load.

The cable compensation circuit 330 includes the diode DC4, four resistors R41-R44, a shunt regulator 331, and the capacitor C41.

The anode of the diode DC4 is connected to the anode voltage VA4 and the cathode of the diode DC4 is connected to one terminal of the resistor R41. The other terminal of the resistor R41 is connected to the node NR4.

The capacitor C41 is connected between the node NR4 and the ground thereby smoothing the voltage VNR4.

The resistor R42 is connected between the node NR4 and the ground. The reference terminal of the shunt regulator 331 is connected to the node NR4, the cathode of the shunt regulator 331 is connected to the reference terminal of the shunt regulator 420 through the resistor R44, and the anode of the shunt regulator 331 is connected to the secondary side ground.

The resistor R43 is connected between the reference terminal and the cathode of the shunt regulator 331.

The anode voltage VA4 is rectified by the diode DC4 and then divided by the resistors R41 and R42 such that the voltage VNR3 is determined. The voltage VNR3 is input to the reference terminal of the shunt regulator 331. The shunt regulator 331 is turned on if the voltage of the reference terminal is more than a predetermined voltage such that the current flows from the cathode to the anode according to the voltage of the reference terminal.

As the output current IO is increased, the voltage VNR4 is increased, and as the voltage VNR4 is increased, the current flowing to the shunt regulator 331 is increased. As the current flowing to the shunt regulator 331 is increased, the reference voltage VR1 of the shunt regulator 420 is decreased.

The second to the sixth exemplary embodiment uses the BJT or the shunt regulator generating the current according to the output current IO controlling the cathode impedance of the shunt regulator.

However, the present invention is not limited thereto, and like the first exemplary embodiment, another exemplary embodiments may have a circuit structure in which the output current IO directly influences the cathode impedance of the shunt regulator.

The cable compensation circuit of the seventh to ninth exemplary embodiments does not include the BJT or the shunt regulator.

Figure 7:
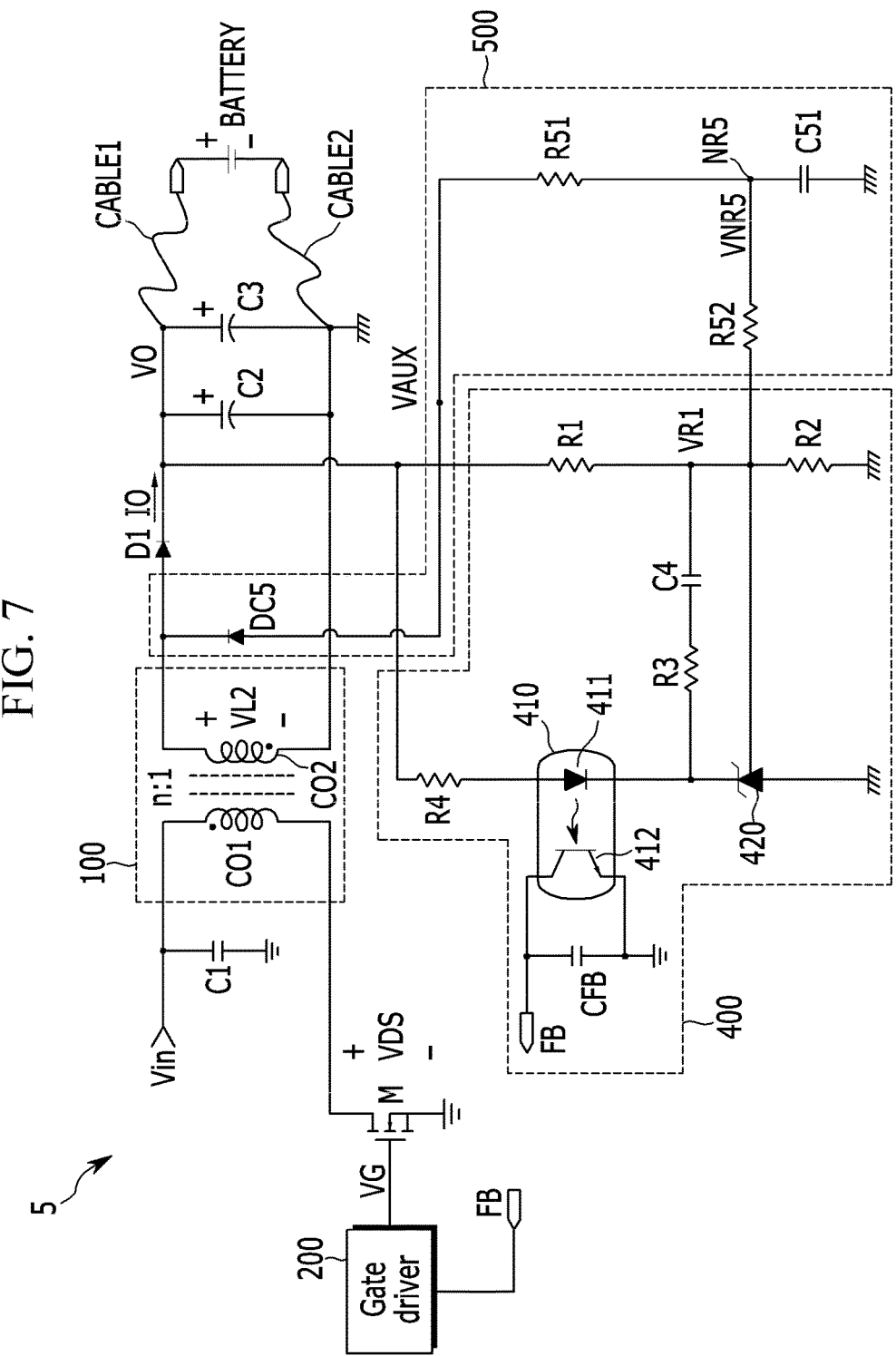
FIG. 7 is a view of a cable compensation circuit according to a seventh exemplary embodiment.

FIG. 7 is a view of a cable compensation circuit according to the seventh exemplary embodiment.

As shown in FIG. 7, the cable compensation circuit 500 according to the seventh exemplary embodiment is connected to the secondary side of a power supply device 5 such that the operation of the feedback circuit is controlled according to the load.

As shown in FIG. 7, the cable compensation circuit 500 includes a diode DC5, two resistors R51 and R52, and a capacitor C51.

The diode DC5 includes the cathode connected to one terminal of the secondary coil CO2, and the anode of the rectifying diode D1 and the anode connected to one terminal of the resistor R51.

The other terminal of the resistor R51 is connected to one terminal of the resistor R52 and one terminal of the capacitor C51. The other terminal of the capacitor C51 is connected to the ground and the other terminal of the resistor R52 is connected to the reference terminal of the shunt regulator 420.

Figure 8:
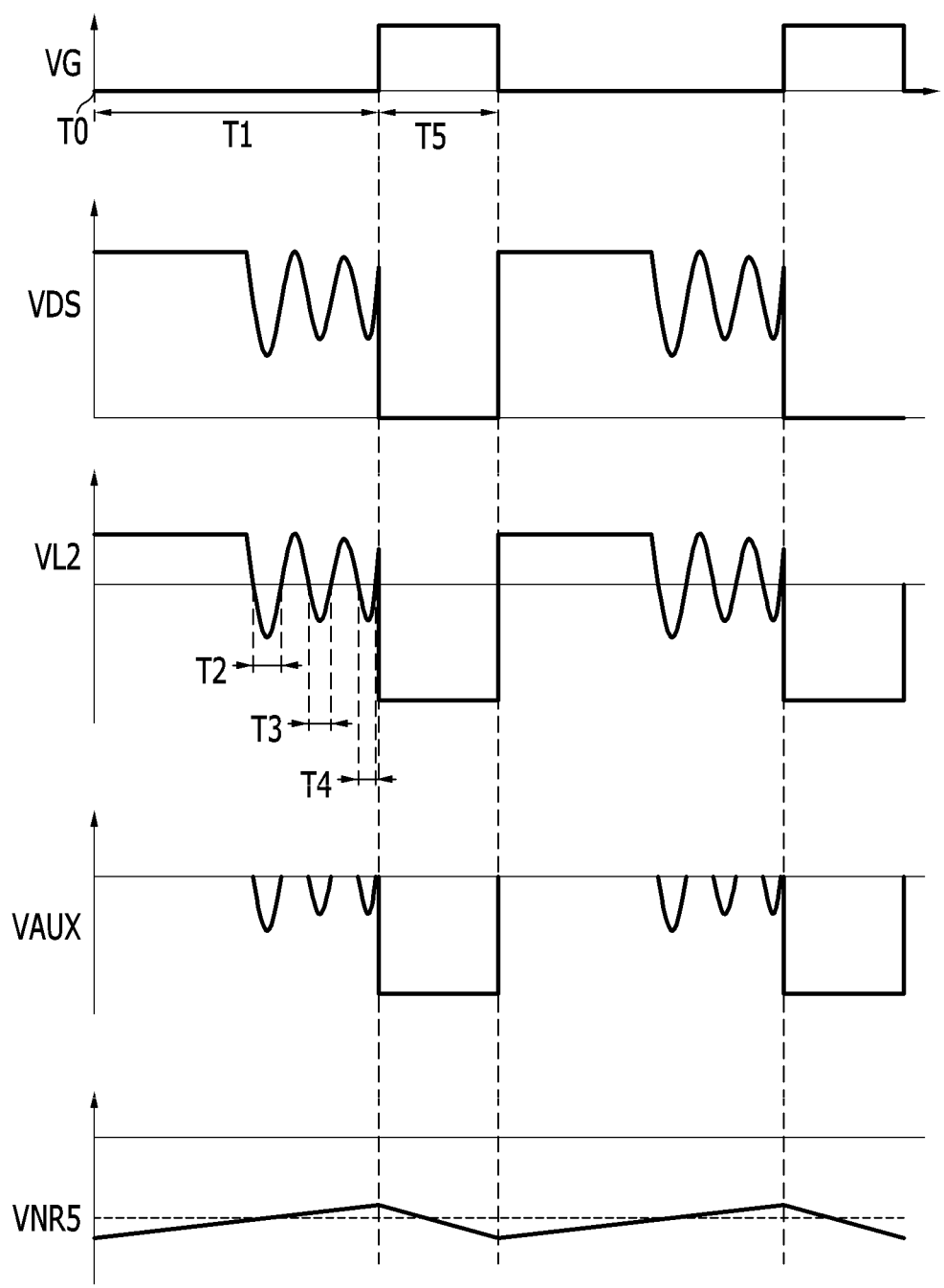
FIG. 8 is a waveform diagram to explain an operation of a cable compensation circuit according to the seventh exemplary embodiment.

FIG. 8 is a waveform diagram to explain an operation of a cable compensation circuit according to the seventh exemplary embodiment.

FIG. 8 shows a gate voltage VG, a drain-source voltage VDS, a secondary side voltage VL2, an assistance voltage VAUX, and a voltage VNR5.

The power switch M is turned on during a period in which the gate voltage VG is the high level, and the power switch M is turned off during a period in which the gate voltage VG is the low level.

The drain-source voltage VDS of the power switch M at a turn-off time T0 of the power switch M is expressed by Equation 1.

$$VDS(T0) = (VO + VF) \cdot n + Vin \quad \text{[Equation 1]}$$

where VO is the output voltage, VF is the forward voltage of the rectifying diode D1, n is the turns ratio, and Vin is the input voltage.

When the energy stored in the primary coil CO1 is exhausted among the turn-off period T1 and a resonance is started, as shown in FIG. 8, the drain-source voltage VDS starts to resonate. During the turn-on period T5 of the power switch M, the drain-source voltage becomes zero voltage.

During the off period T1, the voltage VL2 of the secondary coil CO2 is maintained as a sum of the output voltage VO and the forwarding voltage VF, and then starts to resonate. As shown in FIG. 8, the periods T2, T3, and T4 in which the voltage VL2 becomes the negative voltage are generated. During the on period T5, the voltage VL2 is a negative voltage of which the input voltage Vin is divided by the turns ratio n.

The auxiliary voltage VAUX is the voltage of the node where the anode of the diode DC5 and one terminal of the resistor R51 are connected. In the blocking state of the diode DC5, the auxiliary voltage VAUX is maintained as the 0 voltage.

At the period in which the voltage VL2 is the negative voltage, the diode DC5 is turned on. Thus, the auxiliary voltage VAUX is the voltage of the same waveform as the voltage VL2.

The voltage VNR5 of the node NR5 during the on period T5 of the power switch M, as shown in FIG. 8, is charged and decreased in the negative direction at the negative voltage region by the auxiliary voltage VAUX (an absolute value is increased). During the off period T1 of the power switch M, the voltage VNR5 is charged and increased in the positive direction in the negative voltage region (an absolute value is decreased).

If the output power is increased, that is, the output current IO is increased, the on period is increased such that the voltage VNR5 is further charged and decreased in the negative direction at the negative region. Thus, the reference terminal voltage of the shunt regulator 420, that is, the reference voltage VR1 is further reduced.

Figure 9:
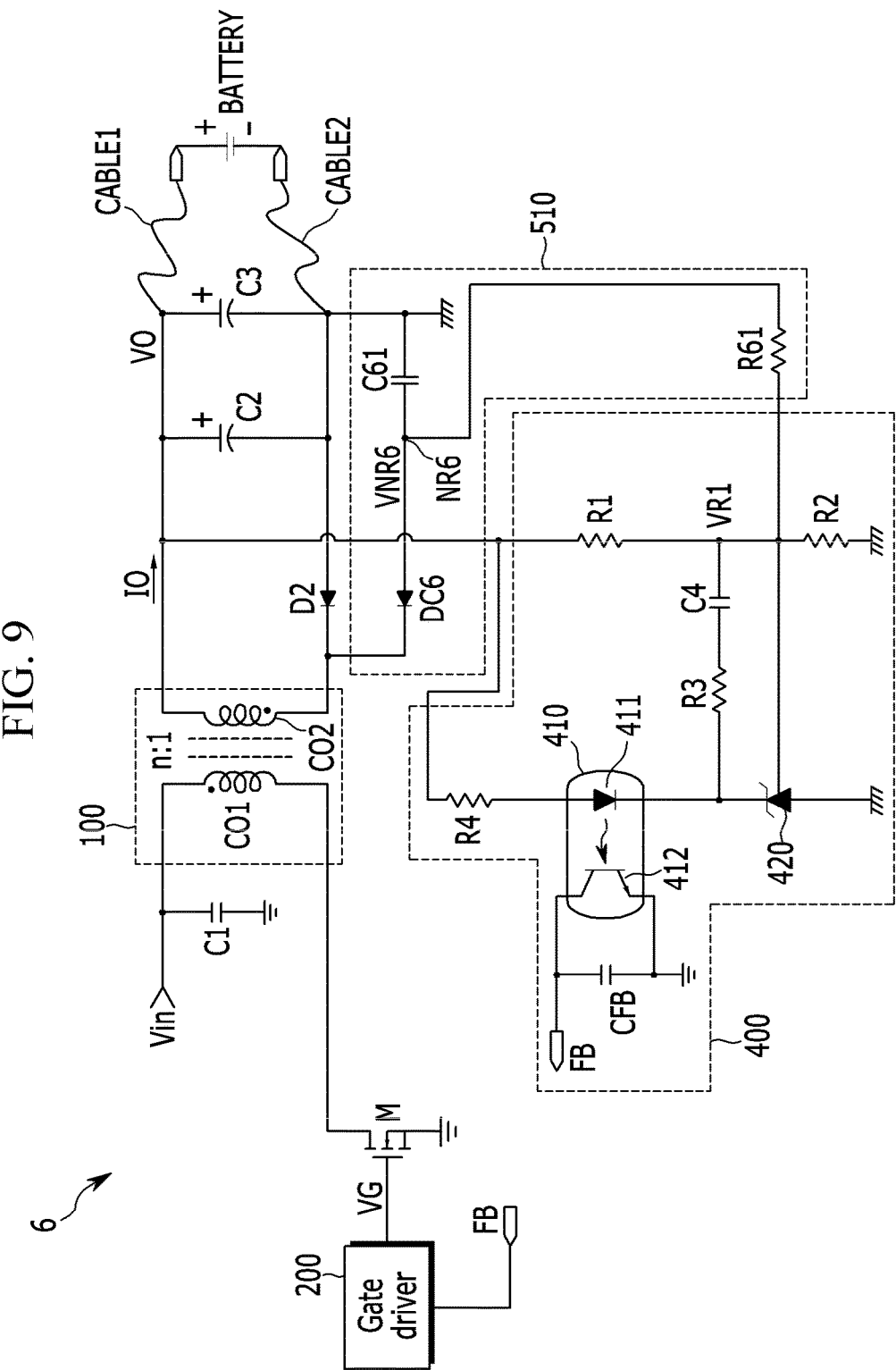
FIG. 9 is a view of a cable compensation circuit according to an eight exemplary embodiment.

FIG. 9 is a view of a cable compensation circuit according to the eighth exemplary embodiment.

As shown in FIG. 9, the cable compensation circuit 510 according to the eighth exemplary embodiment is connected to the secondary side of the power supply device 6 to control the operation of the feedback circuit according to the load.

In FIG. 9, the rectifying diode D2 is connected between the secondary side ground and the other terminal of the secondary coil CO2. During the on period of the power switch M, the other terminal voltage of the secondary coil CO2 is higher than the anode voltage of the rectifying diode D2, that is, the secondary side ground. Accordingly, the rectifying diode D2 is blocked such that the current does not flow through the diode D2. During the off period of the power switch M, the rectifying diode D2 is turned on such that the current is supplied to the load.

The cable compensation circuit 510 includes the diode DC6, the resistor R61, and the capacitor C61.

The diode DC6 includes the cathode connected to the other terminal of the secondary coil CO2 and the anode connected to one terminal of the capacitor C61. The other terminal of the capacitor C61 is connected to the secondary side ground. The resistor R61 is connected between the node NR6 and the reference terminal of the shunt regulator 420. The capacitor C61 stores a difference between the forward voltages of two diodes.

The operation of the cable compensation circuit 510 according to the eighth exemplary embodiment is as follows.

That is, as the voltage VNR6 of the node NR6 increases, the difference between a change amount of the forward voltage of the rectifying diode D2 according to the output current IO and the forward voltage of the diode DC6 that is almost constant appears as the negative voltage. That is, if the output current IO is increased, the forward voltage of the diode D2 is increased such that the voltage VNR6 of the node NR6 is further reduced. Thus, the reference voltage VR1 is decreased according to the increase of the output current IO.

Figure 10:
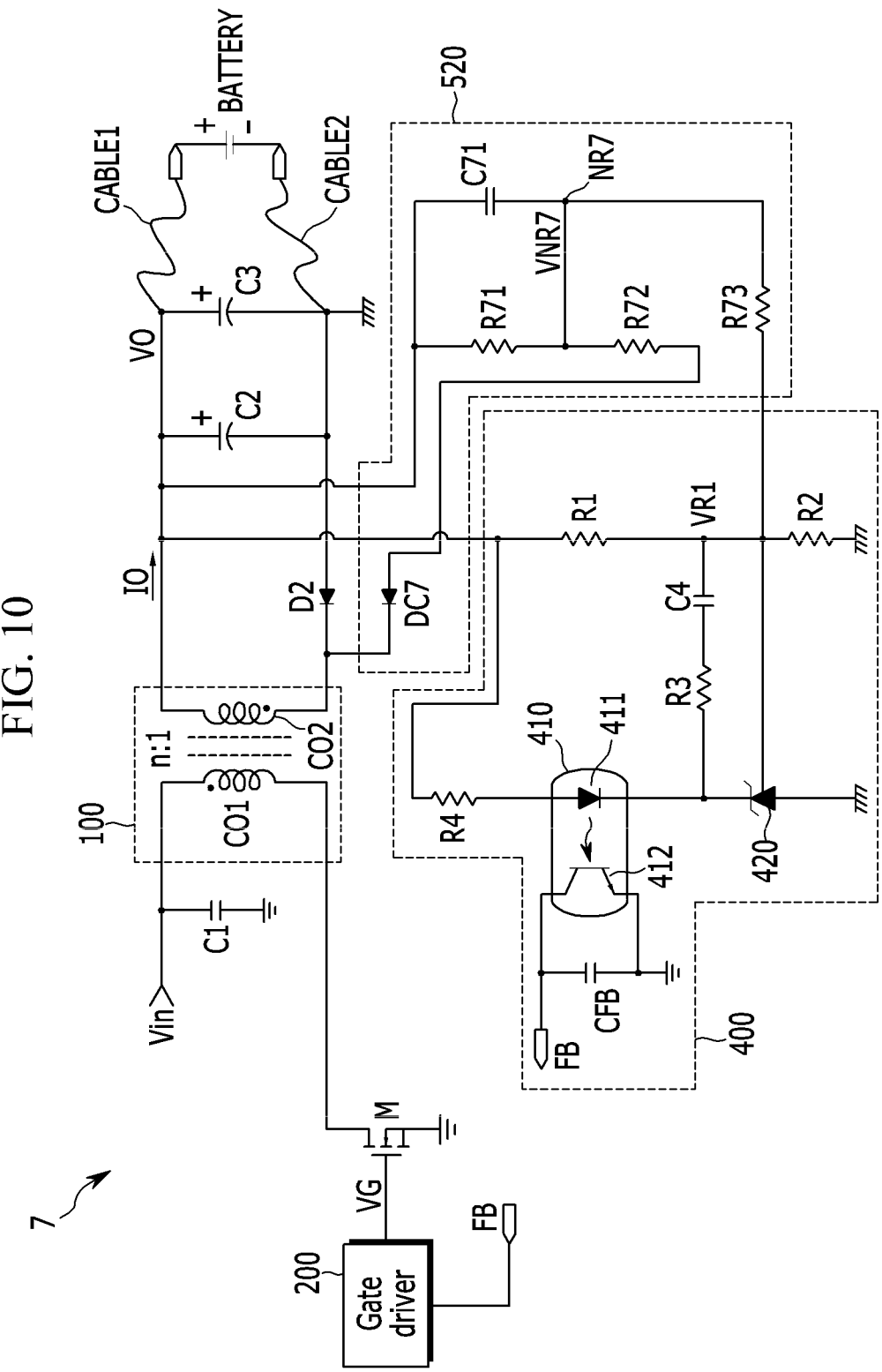
FIG. 10 is a view of a cable compensation circuit according to a ninth exemplary embodiment.

FIG. 10 is a view of a cable compensation circuit according to the ninth exemplary embodiment.

As shown in FIG. 10, the cable compensation circuit 520 according to the ninth exemplary embodiment is connected to the secondary side of the power supply device 7 to control the operation of the feedback circuit according to the load.

The cable compensation circuit 520 includes the diode DC7, three resistors R71, R72, and R73, and the capacitor C71.

The diode DC7 includes the cathode connected to the other terminal of the secondary coil CO2 and the anode connected to one terminal of the resistor R72. The other terminal of the resistor R72 is connected to one terminal of the resistor R71. The other terminal of the resistor R71 is connected to the output voltage VO. The voltage VNR7 of the node NR7 to which the resistor R71 and the resistor R72 are connected between the reference terminal of the shunt regulator 420 through the resistor R73. The capacitor C71 is connected between the output voltage VO and the node NR7 thereby smoothing the voltage VNR7.

After the power switch M is turned off, while the rectifying diode D2 is turned on, the voltage of both terminals of the capacitor C71 is increased. As the output current IO is increased, the turn-on time of the rectifying diode D2 becomes longer such that the voltage of both terminals of the capacitor C71 is further increased. The voltage VNR7 of the node NR7 is a value of which the voltage of both terminals of the capacitor C71 is subtracted from the output voltage VO such that the voltage VNR7 of the node NR7 is decreased according to the increase of the load. Thus, the reference voltage VR1 is also decreased according to the increase of the output current IO.

In the described exemplary embodiments, the cathode impedance of the shunt regulator is increased according to the increase of the output current IO such that the energy transmitted to the secondary side is increased. Accordingly, the voltage drop generated in the cables CABLE1 and CABLE2 according to the increase of the output current IO may be compensated.

When providing a detecting resistor at a path where the output current IO flows to sense the output current IO, power consumption may be generated in the detecting resistor. Differently from an exemplary embodiment, when using a primary side regulation method, an additional coil to sense the information for the output terminal must be provided such that the complexity and the size of the transformer are increased.

According to the exemplary embodiments, the unnecessary power consumption may be prevented without increasing of the size and the complexity of the transformer, and the circuit compensating the voltage drop generated in the cables is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Also, in the appended claims, the ordinal numbers described along with the elements do not to express the orders thereof, but are used only to distinguish the elements described with the same words.

DESCRIPTION OF SYMBOLS power supply device 10, 20, 1-7
capacitor C1, C4, C5, C6, CFB, C11, C21, C31, C41, C51, C61, C71
transformer 100
cable compensation circuit 250, 270, 300, 310, 320, 330, 500, 510, 520
rectifying diode D1, output capacitor C2 and C3, power switch M
gate driver 200, feedback circuit 400, primary coil CO1
secondary coil CO2, opto-coupler 410
shunt regulator 420 and 331
resistor R1-R9, R11-R14, R21-R25, R31-R34
resistor R41-R44, R51, R52, R61, R71-R73
opto-diode 411, opto-transistor 412
diode DC11, DC12, DC1-DC7
BJT Q1, Q2, Q31, Q32, Q

What is claimed is:

1. A power supply device, comprising:
   a first node to provide a voltage that is changed based on an output current of the power supply device;
   a rectifying diode coupled to the first node to which output current flows; and
   a cable compensation circuit including at least a diode coupled between the first node and a second node to supply a current to the second node, wherein the first node is an input node of the rectifying diode and the diode of the cable compensation circuit, and wherein a current flowing through the rectifying diode does not flow through the diode of the cable compensation circuit,
   wherein a current flowing through a first shunt regulator is controlled based on a difference between a reference voltage of the shunt regulator and an anode voltage of the shunt regulator, an increase in the difference between the reference voltage and the anode voltage corresponding to an increase in the current flowing through the shunt regulator,
   wherein the difference between the reference voltage and the anode voltage decreases in response to an increase of the voltage of the second node,
   wherein the difference between the reference voltage and the anode voltage increases in response to an increase of a voltage on a cathode of the rectifying diode,
   wherein a feedback voltage changes based on the current flowing through the first shunt regulator, and
   wherein an anode of the diode is coupled to an anode of the rectifying diode at the first node.

2. The power supply device of claim 1, further comprising:
   a first resistor coupled between a cathode of the diode and the second node;
   a second resistor having a first terminal coupled to the second node and a second terminal coupled to a ground; and
   a first transistor having a control terminal coupled to the second node and a first terminal coupled to the reference terminal of the first shunt regulator.

3. The power supply device of claim 2, further comprising a first capacitor coupled between the second node and the ground.

4. The power supply device of claim 2, further comprising:
   a second capacitor coupled between the cathode of the diode and the ground.

5. The power supply device of claim 4, further comprising a third resistor coupled between the first terminal of the first transistor and the reference terminal of the first shunt regulator.

6. The power supply device of claim 2, further comprising:
   a third resistor coupled between the second node and the control terminal of the first transistor; and a fourth resistor coupled between the first terminal of the first transistor and the reference terminal of the first shunt regulator.

7. The power supply device of claim 2, further comprising:
a third resistor coupled between the second node and the control terminal of the first transistor;
a fourth resistor coupled between the second node and the ground; and
a fifth resistor coupled between the first terminal of the first transistor and the reference terminal of the first shunt regulator.

8. The power supply device 7, wherein a temperature change characteristic of the fourth resistor is opposite a temperature change characteristic of the first transistor.

9. The power supply device 2, further comprising:
a third resistor coupled between the second node and the control terminal of the first transistor;
a second transistor coupled between the second node and the ground; and
a fourth resistor coupled between the first terminal of the first transistor and the reference terminal of the first shunt regulator.

10. The power supply device 9, wherein a forward voltage of the second transistor is to be decreased based on a temperature change to compensate a current increase of the second transistor based on the temperature change, or the forward voltage of the second transistor is to be increased based on the temperature change to compensate a current decrease of the second transistor based on the temperature change.

11. The power supply device of claim 1, further comprising:
a first resistor coupled between the cathode of the diode and the second node;
a second resistor having a first terminal coupled to the second node and a second terminal coupled to a ground; and
a second shunt regulator coupled to the reference terminal of the first shunt regulator,
wherein current flowing to the second shunt regulator is to be varied based on the voltage of the second node and is to change the reference terminal voltage of the second shunt regulator.

12. The power supply device of claim 11, wherein the reference terminal of the second shunt regulator is coupled to the second node, and the cable compensation circuit further comprises:
a third resistor coupled between the reference terminal of the second shunt regulator and the cathode of the second shunt regulator; and
a fourth resistor coupled between the cathode of the second shunt regulator and the reference terminal of the first shunt regulator.

13. The power supply device of claim 11, further comprising a first capacitor coupled between the second node and the ground.

14. A power supply device, comprising:
a first node to provide a voltage that is changed based on an output current of the power supply device;
a rectifying diode coupled to the first node to which output current flows; and
a cable compensation circuit including at least a diode that provides a current to a second node and that is coupled between the first node and an anode of a shunt regulator, wherein the first node is an input node of the rectifying diode and the diode of the cable compensation circuit, and wherein a current flowing through the rectifying diode does not flow through the diode of the cable compensation circuit,
wherein a current flowing through the shunt regulator is controlled based on the voltage of the first node and the second node,
wherein the current flowing through the shunt regulator increases in response to an increase in a voltage of the first node,
wherein the current flowing through the shunt regulator decreases in response to an increase in a voltage of the second node,
wherein a feedback voltage changes based on the current flowing through the shunt regulator, and
wherein an anode of the diode is coupled to an anode of the rectifying diode at the first node.

15. The power supply device of claim 14, further comprising:
a first resistor coupled between the first node and the ground; and
a capacitor coupled to the first resistor in parallel,
wherein the capacitor is to filter a noise of the voltage of the first node.

16. A power supply device, comprising:
a first node to provide a voltage that is changed based on an on period of a power switch of the power supply device; and
a cable compensation circuit including at least a first diode that is coupled between a second node and a rectifying diode to which an output current of the power supply device flows, and wherein a cathode of the first diode is coupled to the first node, and wherein a current flowing through the rectifying diode does not flow through the first diode,
wherein the second node is coupled to a reference terminal of a shunt regulator and a cathode impedance of the shunt regulator is controlled based on a voltage of the second node,
wherein a feedback voltage changes based on the cathode impedance of the shunt regulator,
wherein the cathode of the first diode is coupled to an anode of the rectifying diode at the first node, and
wherein the cathode of the first diode is coupled to the anode of the rectifying diode, and the cable compensation circuit further comprises a first resistor coupled between the anode of the first diode and the second node, and a capacitor coupled between the second node and ground.

17. The power supply device of claim 16, wherein the anode of the rectifying diode is coupled to a secondary coil of the power supply device, and when a power switch of the power supply device is turned on, the rectifying diode is to be turned on by a voltage of the secondary coil.

18. The power supply device of claim 16, wherein:
the first diode is coupled between a cathode of the rectifying diode and the second node, and the cable compensation circuit further comprises:
a capacitor to store a difference between a forward voltage of the rectifying diode generated by the output current and a forward voltage of a second diode.

19. The power supply device of claim 18, wherein the capacitor is coupled between the second node and the ground, and a forward voltage of the rectifying diode is increased by an increase of the output current such that a negative voltage charged to the capacitor is decreased.

20. The power supply device of claim 18, wherein:
the capacitor is coupled between an output voltage and the second node; and
a forward voltage of the rectifying diode is increased based on an increase of the output current such that the voltage of the second node is decreased based on an increase of the voltage charged to the capacitor.

21. The power supply device of claim 20, further comprising:
a second resistor coupled between an anode of the second diode and the second node; and
a third resistor coupled between the output voltage and the second node.

22. The power supply device of claim 16, further comprising:
a first resistor connected between the second node and a reference terminal of the shunt regulator.

\* \* \* \* \*